(12) United States Patent
Divan et al.

(10) Patent No.: US 9,114,281 B2
(45) Date of Patent: Aug. 25, 2015

(54) ACTIVE AC SNUBBER FOR DIRECT AC/AC POWER CONVERTERS

(71) Applicant: GEORGIA TECH RESEARCH CORPORATION, Atlanta, GA (US)

(72) Inventors: Deepakraj M. Divan, San Jose, CA (US); Anish Prasai, San Jose, CA (US)

(73) Assignee: GEORGIA TECH RESEARCH CORPORATION GEORGIA INSTITUTE OF TECHNOLOGY, Atlanta, GA (US)

( * ) Notice: Subject to any disclaimer, the term of this patent is extended or adjusted under 35 U.S.C. 154(b) by 334 days.

(21) Appl. No.: 13/844,166

(22) Filed: Mar. 15, 2013

(65) Prior Publication Data

US 2013/0308346 A1 Nov. 21, 2013

Related U.S. Application Data

(60) Provisional application No. 61/611,333, filed on Mar. 15, 2012.

(51) Int. Cl.
 *H02M 1/34* (2007.01)
 *A63B 21/22* (2006.01)
 *H02M 5/297* (2006.01)

(52) U.S. Cl.
 CPC ............... *A63B 21/22* (2013.01); *H02M 1/34* (2013.01); *H02M 5/297* (2013.01); *A63B 2021/222* (2013.01)

(58) Field of Classification Search
 CPC ........................................................ H02M 1/34
 See application file for complete search history.

(56) References Cited

U.S. PATENT DOCUMENTS

| 6,108,218 | A  | * | 8/2000 | Igarashi et al. | ............ 363/21.16 |
| 8,345,452 | B2 | * | 1/2013 | Alexander | ....................... 363/17 |
| 2008/0088363 | A1 | * | 4/2008 | Bybee | ............................ 327/552 |
| 2009/0016089 | A1 | * | 1/2009 | Nguyen | ........................ 363/125 |

OTHER PUBLICATIONS

Prasai et al, Active AC Snubber for Direct AC/AC Power Converters, Sep. 17-22, 2011, IEEE—Energy Conversion Congress & Exposition ECCE, ISBN 978-1-4577-0542-7, pp. 507-514.*

* cited by examiner

*Primary Examiner* — Emily P Pham
(74) *Attorney, Agent, or Firm* — Sheppard Mullin Richter & Hampton LLP

(57) ABSTRACT

Active AC snubbers for AC/AC converters are provided. The active snubbers are actively-controlled AC snubbers that may be used in AC/AC power converters including direct AC converters. The active snubbers provide a free-wheeling path for AC/AC converters, ensuring that the converters are tolerant of errors in measurements and timings and of faults. The desired safe commutation of the switching devices when accurate measurements of voltage and current polarities become difficult or under fault contingencies when trapped energy needs to be dispatched safely is ensured. In addition, the active AC snubber may provide equal voltage sharing among the series-connected devices and clamp output voltages.

22 Claims, 10 Drawing Sheets

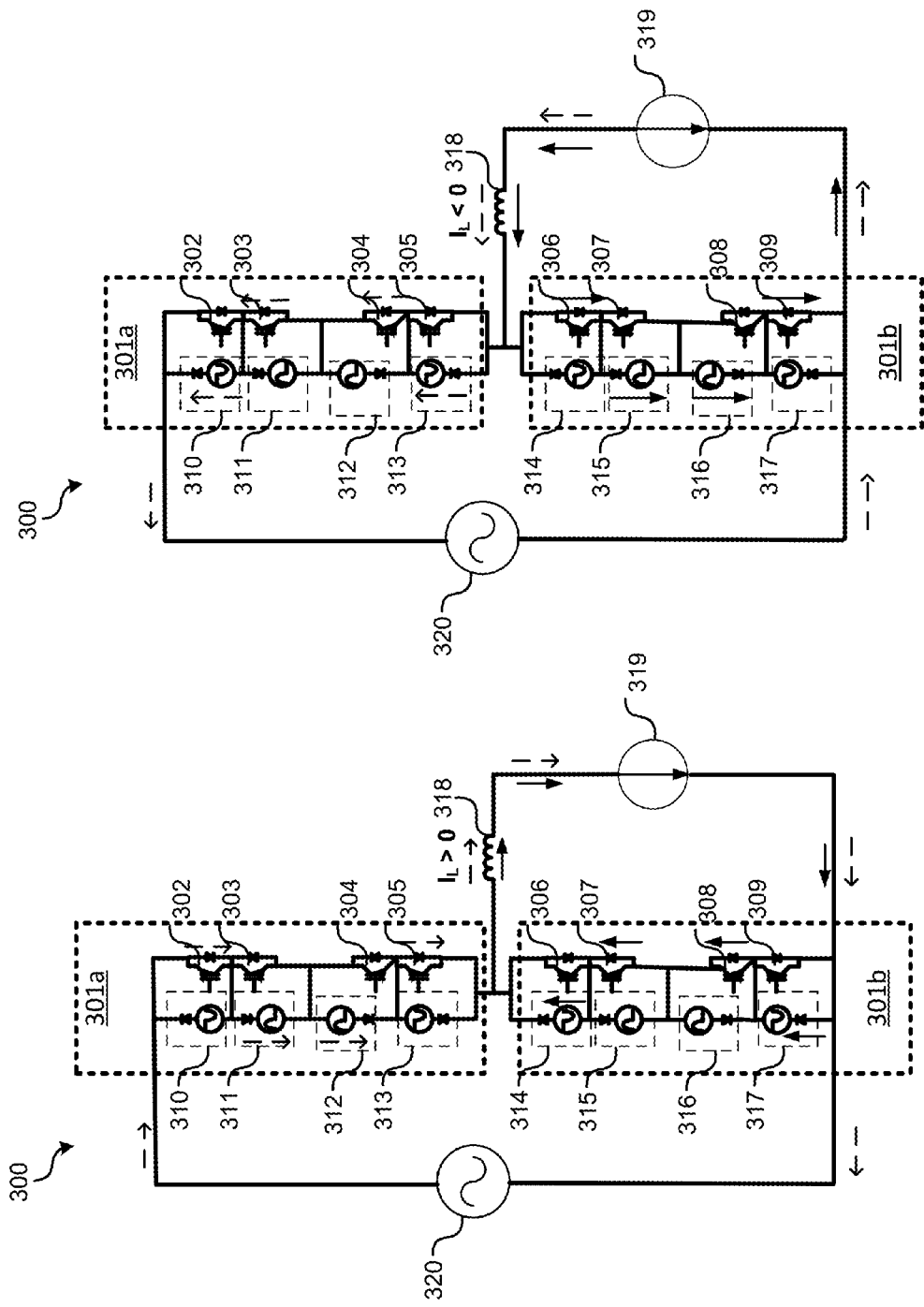

US 9,114,281 B2

ACTIVE AC SNUBBER FOR DIRECT AC/AC POWER CONVERTERS

CROSS-REFERENCE TO RELATED APPLICATIONS

This application claims the benefit of U.S. Provisional Patent Application No. 61/611,333, filed on Mar. 15, 2012, entitled "Active AC Snubber for Direct AC/AC Power Converters," which is hereby incorporated herein by reference in its entirety.

TECHNICAL FIELD

The present invention(s) relate generally to power converters. More particularly, the invention(s) relate to active AC snubber for direct AC/AC power converters.

DESCRIPTION OF THE RELATED ART

Applications of AC to AC (AC/AC) converters such as matrix converters are limited at medium voltages, due to the high device counts and poor fault tolerance. Errors in voltage and current measurements invariably exist and create challenges to the safe operation of the AC/AC converters including direct AC converters, such as causing incorrect switch patterns. Such incorrect switch patterns may result in large voltage spikes when a current path suddenly becomes open, or a large and potentially detrimental shoot-through when a capacitor is shorted. These errors degrade the performance and the life of the AC/AC converter.

BRIEF SUMMARY OF EMBODIMENTS OF THE INVENTION

According to various embodiments of the invention, active AC snubbers are provided. The active snubbers are actively-controlled AC snubbers that may be used in AC/AC power converters including direct AC converters. The active snubbers provide a free-wheeling path for AC/AC converters, ensuring that the converters are tolerant of errors in measurements and timings and of faults. Various embodiments provide the desired safe commutation of the switching devices when accurate measurements of voltage and current polarities become difficult or under fault contingencies when trapped energy needs to be dispatched safely. In addition, the active AC snubber may provide equal voltage sharing among the series-connected devices and clamp output voltages.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 3A illustrates the commutation between cells of a two-level AC chopper when the inductor current is positive.
FIG. 3B illustrates the commutation between cells of a two-level AC chopper when the inductor current is negative.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Operations of AC/AC converters including direct AC converters require accurate measurements of voltage and current polarity to commutate the switches safely, because no free-wheeling paths are provided when the devices are turned-off suddenly or incorrectly sequenced. A complex switching pattern that is based on voltage and/or current polarity is usually necessary to ensure this safe switching in an AC/AC converter, especially when scaling to higher voltages or undergoing a major fault. As a result, a snubber circuit is required to provide a free-wheeling path for direct AC converters and to ensure that the converters are tolerant of errors in measurements and timings as well as of faults.

Figure 1A:
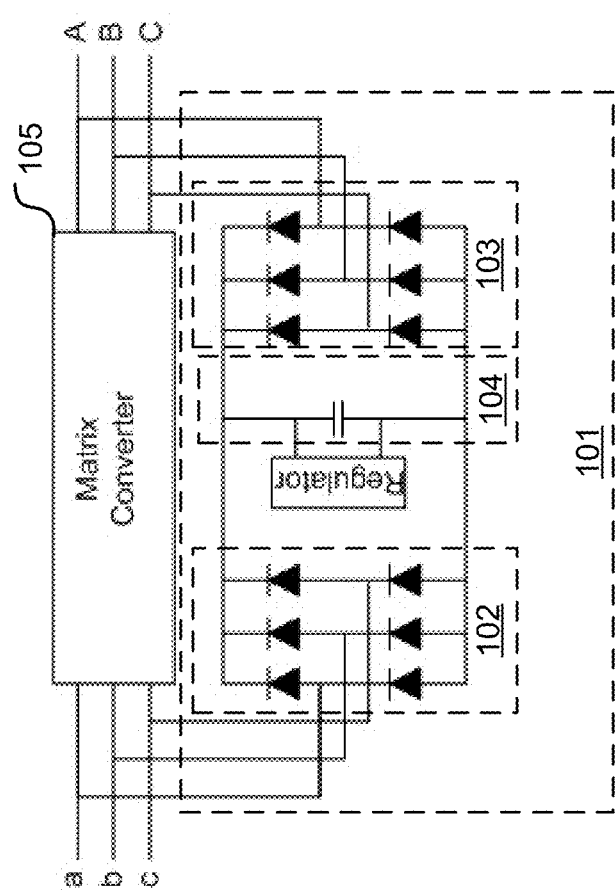
FIG. 1A is a circuit diagram illustrating a prior art snubber.
Figure 1B:
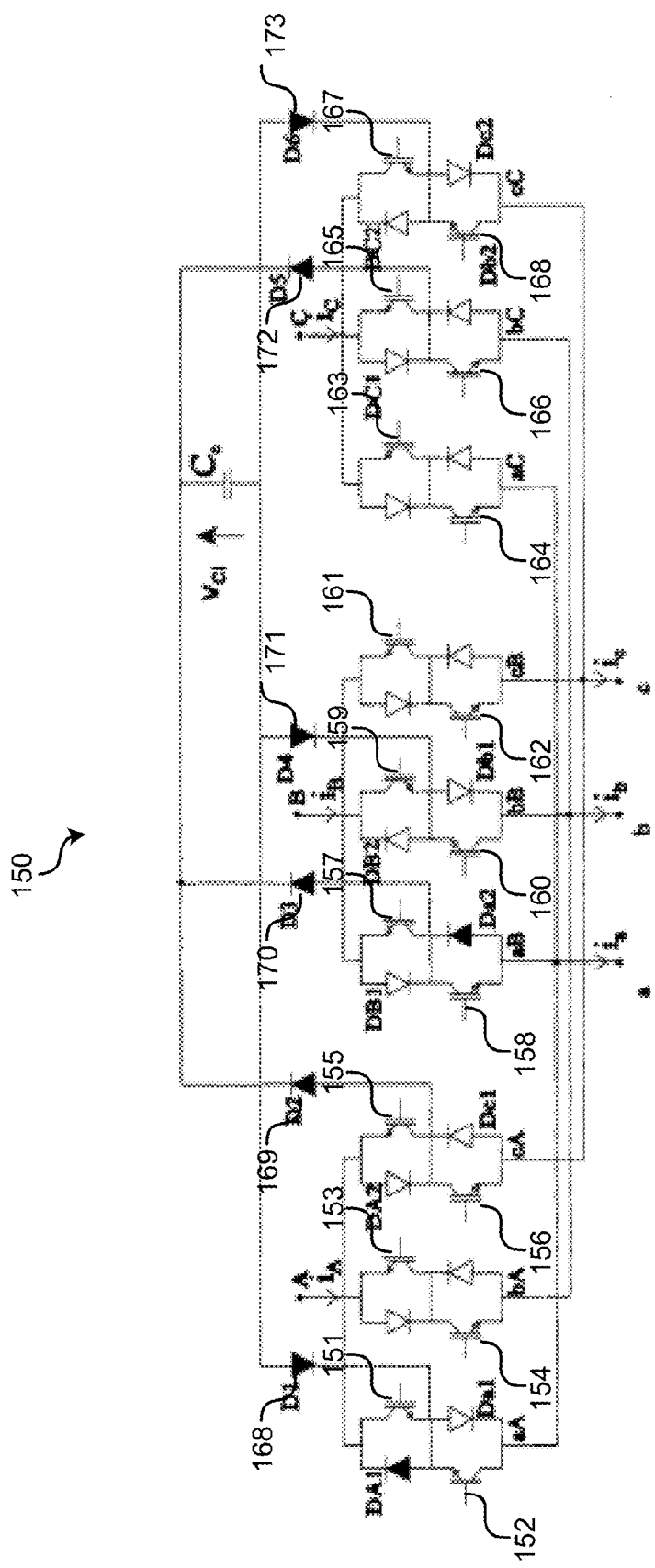
FIG. 1B is a circuit diagram illustrating a prior art snubber.

FIG. 1A is a circuit diagram illustrating a prior art snubber 101. The snubber 101 is implemented with a matrix converter 105. The diode bridges 102-103 feed a DC regulated snubber capacitor 104. FIG. 1B is a circuit diagram illustrating a prior art snubber 150, which has essentially the same characteristics as the snubber 101. Common-emitter and common-collector configurations are implemented among the primary devices 151-167. For example, emitters of switches 151 and 152 are connected and collectors of switches 153 and 154 are connected. This common-emitter or common-collector pairing configuration along with the diodes 168-173 enable antiparallel diodes of the primary devices 151-167 to provide a path for the snubbed energy. As such, when the main devices 151-167 are misfired or during a fault, energy stored in leakage and load may be handled safely.

Nevertheless, the snubber 101 in FIG. 1A and the snubber 150 in FIG. 1B have major limitations that complicate scaling up direct AC/AC converters. First, the performance of the converter may be degraded by the spike occurring every time when the snubber operates. The performance of the converters will be degraded when the spikes occur more frequently from incorrect commutation sequences. This spike equals to the magnitude of the snubber DC voltage and is reflected across the input and/or output of the converter. Second, the snubber configurations illustrated in FIGS. 1A and 1B cannot be scaled up easily. Thus, these configurations cannot be used easily for scaling up AC/AC converter to higher voltages and power levels.

Further, equal voltage sharing between series-connected devices is challenging when voltages are scaled up. While complex gate drive circuitries have been commercially utilized to provide gate-charge control to ensure voltage sharing, they come at the cost of higher switching losses. Further, if high switching frequency is also desired when scaling up with smaller devices, managing gate-charge control reliably becomes increasingly more difficult, especially within the nanosecond time intervals. Last, the snubber configurations illustrated in FIGS. 1A and 1B are not phase independent. The snubbers cross-couple operations of the three phases due to the common snubber capacitor. A single-phase fault undermines robustness and reliability of all three phases, which is highly undesirable.

Figures 2A, 2B:
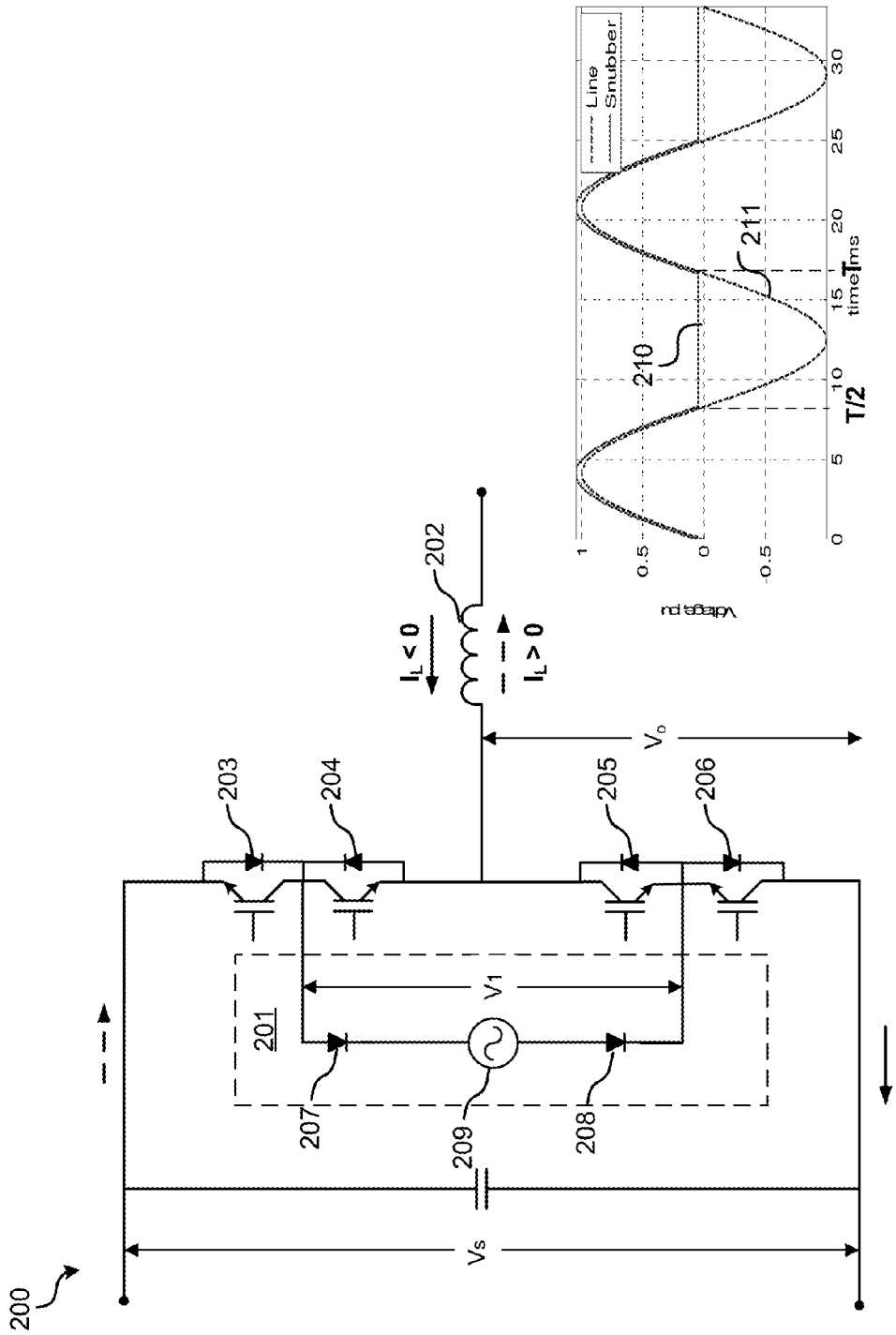
FIG. 2A illustrates an exemplary schematic diagram of an active AC snubber circuit applied to a single-phase AC chopper cell.
FIG. 2B depicts a conceptual waveform of the voltage of the active snubber 201.

FIG. 2A illustrates an exemplary schematic diagram 200 of an active AC snubber circuit implemented with a single-phase AC chopper cell. In the illustrated example, the AC snubber 201 comprises diodes 207-208 and an AC source circuit 209. The AC source circuit 209 actively regulates the voltage of the AC snubber 201 $V_1$. In the illustrated example, the AC snubber 201 is applied to a single-phase AC buck converter comprising two AC (bi-directional) switches in common-collector and common-emitter configurations. The current paths through the snubber 201 have two directions: 1) forward direction where the current through the inductor 202 is positive; and 2) reverse direction where the current through the inductor 202 is negative. When an operational current path (i.e., the current path provided by the devices of an AC-AC converter) of the AC chopper cell is interrupted, and the inductor current is positive, the "free-wheeling" path is provided by the diode of switch 203 and the diode 207, through the actively regulated snubber voltage 209, diode 208 and the diode of switch 205. When the inductor current is negative, the "free-wheeling" path is provided by the diode of switch 204 and the diode 207, through the actively regulated snubber voltage 209, diode 208 and the diode of switch 206.

Further, the voltage spike on the output due to snubber operation may be eliminated by regulating the AC source circuit 209 appropriately, thus improving the total harmonic distortion (THD) of the buck converter ensuring that volt-second balance across the output filter is well maintained. The regulated voltage for the AC snubber 201 is the envelope of the voltage blocked by the main devices 203-206. In one embodiment, as illustrated in FIG. 2B, the regulated voltage provided by the AC source circuit 209 is a half-wave rectified line voltage 210 that is maintained slightly higher than the line voltage 211 in order to reverse bias the diodes 207 and 208 such that the AC source circuit 209 does not compete with the AC grid or source voltage in regulating the snubber voltage. In various embodiments, the active snubber 201 may comprise a control module (not shown). The control module may regulate the AC source circuit 209 such that the output of the AC source circuit 209 is a half-wave rectified line voltage.

FIG. 2B depicts a simulation waveform of the voltage of the active snubber 201. As illustrated, the snubber 201 maintains essentially the same voltage as the line voltage during the positive half-cycle (0, T/2) and zero voltage during the negative half-cycle (T/2, T), but with a slight DC offset sufficient (for example, just sufficient) to keep the snubber diodes reverse biased when energy is not being snubbed. The DC offset voltage reverse biases the diodes 207-208 such that the AC snubber 201 does not draw energy from the line needlessly. Since the AC snubber 201 is maintaining essentially the same voltage as the line voltage during positive half-cycle and zero voltage during negative half-cycle, a voltage equal to the line voltage or zero is applied across the output, replicating the output as if the converter were operating correctly and the AC snubber 201 was not in operation.

An active AC snubber, such as the active AC snubber 201 illustrated in FIG. 2A, may be integrated with various AC/AC converters. The snubber may enable the use of lower costing sensors and controllers with sub-stellar delays and accuracies while still ensuring safe commutation of the devices. Additionally, fault tolerance of the power converter and system is kept high, where should the power devices be suddenly turned off due to either an external or internal fault, the energy trapped in the filters and parasitics of the converter can be safely managed by the snubber to be stored for future use or dissipated appropriately, without causing catastrophic failure of the converter system. When applied across each series-connected device, equal voltage sharing may also be ensured.

FIGS. 3A and 3B illustrates two-level AC chopper with implementation of active snubbers. The arrows demonstrate the snubbing or the clamping path for both forward and reverse currents. As illustrated, the two-level AC chopper 300 comprises cells 301a and 301b, which are connected in series. When scaling a converter through simple series connection of the devices, a snubber can be applied around each switching devices (for example, power transistors 302-309). In the illustrated example, active snubbers 310-317 are implemented in parallel to switches 302-309, respectively.

FIG. 3A illustrates the commutation between the top cell 301a and the bottom cell 301b of the two-level AC chopper 200 when the current through the inductor 319 is positive. When the current through the inductor 319 is positive, the two-level AC chopper may operate in two modes. In the first mode, switches 302 and 305 are on and switches 303 and 304 are off, the commutation is from the top cell 301a to the bottom cell 301b via the path comprising switches 302 and 305, and snubbers 311 and 312. In the second mode, switches 307 and 308 are on and switches 306 and 309 are off, the commutation is from the bottom cell 301b to the top cell 301a via the path comprising switches 307 and 308, and snubbers 314 and 317.

FIG. 3B illustrates the commutation between the top cell 301a and the bottom cell 301b of the two-level AC chopper 200 when the current through the inductor 319 is negative. The two-level AC chopper 300 may operate in two additional modes/. In a third mode, switches 303 and 304 are on and switches 302 and 305 are off, the commutation is from the top cell 301a to the bottom cell 301b via the path comprising switches 303 and 304, and snubbers 310 and 313. In a fourth mode, switches 306 and 309 are on and switches 307 and 308 are off, the commutation is from the bottom cell 301b to the top cell 301a via the path comprising switches 306 and 309, and snubbers 315 and 316.

Equal voltage sharing among the devices 302-309 as well as between AC chopper cells 301a and 301b is ensured. In each mode, the voltage across a switching device is half of the input voltage. As illustrated in FIG. 2B, the voltage across an active snubber should be regulated to maintain the same voltage as the main device it is interfacing. Accordingly, depending on the corresponding switching device to which an active snubber is coupled, the voltage across each of the snubbers is regulated to be half the positive half-cycle of the input voltage, or half the negative half-cycle of the input voltage. For example, the voltage across each of the snubbers 310-313 is regulated to be half the positive half-cycle of the input voltage, and the voltage across each of the snubbers 314-317 is regulated to be half the negative half-cycle of the input voltage.

Various embodiments are based on a DC/DC converter topology where the DC/DC converter wave-shapes the half-wave rectified voltage across a main snubber capacitor, while the DC capacitors provide energy storage to wave-shape. The converter may be a simple buck-boost topology, or isolated with flyback-type topology. In various embodiments, as a snubber does not carry continuous duty current, its power rating is relatively small compared to the main devices, and thus can potentially be integrated as part of the gate driver itself.

Figure 4B:
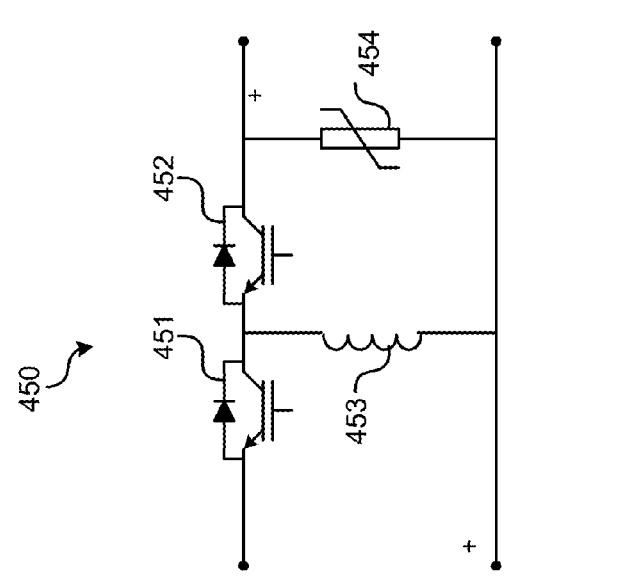
FIG. 4B is a circuit diagram of an exemplary snubber.
Figure 4A:
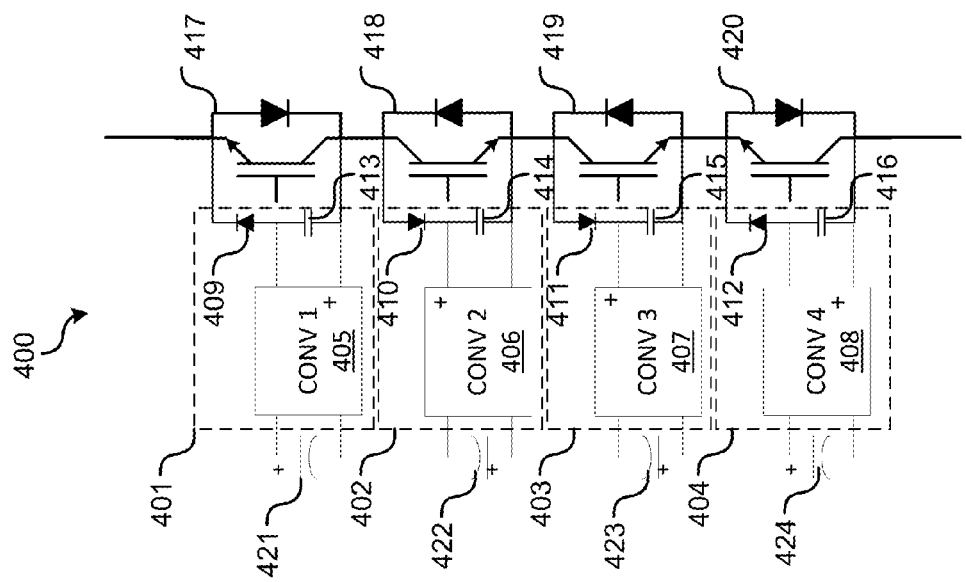
FIG. 4A illustrates an exemplary implementation of DC-DC converter based active AC snubbers applied to two series-connected AC switches.

FIG. 4A illustrates an exemplary implementation 400 of DC-DC converter based active AC snubbers 401-404. The snubbers 401-404 may be based on a DC-DC converter topology, such as the DC-DC converter 450 illustrated in FIG. 4B. Each of the snubbers 401-404 comprises a DC-DC converter, a diode, and a snubber capacitor. For example, the active snubber 401 comprises a DC-DC converter 405, a diode 409, and a snubber capacitor 413. In various embodiments, each of the snubbers 401-404 may further comprise a DC capacitor. For example, the active snubber 401 may further comprise a DC capacitor 421. The DC capacitors 421-424 provide energy storage to shape output voltage of the snubbers 401-404. In some embodiments, the DC capacitors 421-424 may be combined together as a single tank to reduce component count, such as when the converters 405-408 having isolated topologies with a flyback converter.

In various embodiments, each of the active snubbers 401-404 may comprise a control module to control their output voltage. By controlling a duty cycle of each of the converters 405-408, such as by controlling the switching on and off of the switches 451-452 of the DC-DC converter 450, the output voltage of each of the converters 405-408 is shaped to be a half-wave rectified voltage. As such, the converters 405-408 may provide a half-wave rectified voltage across the snubber capacitors 413-416, respectively. The converters 405-408 are DC-DC converters, such as a boost converter, a buck converter, or isolated with a flyback converter.

FIG. 4B is a circuit diagram of an exemplary snubber 400. As illustrated, in some embodiments, a MOV 454 may be placed in parallel to the output of the DC-DC converter 550 to dissipate large amount of excess energy during fault contingencies when devices are turned off suddenly. The MOV 454 clamps the voltage across the capacitors 413-416 within a certain level and dissipates the excess energy, protecting both the main devices 417-420 and the snubber circuitry 401-404.

Figure 4C:
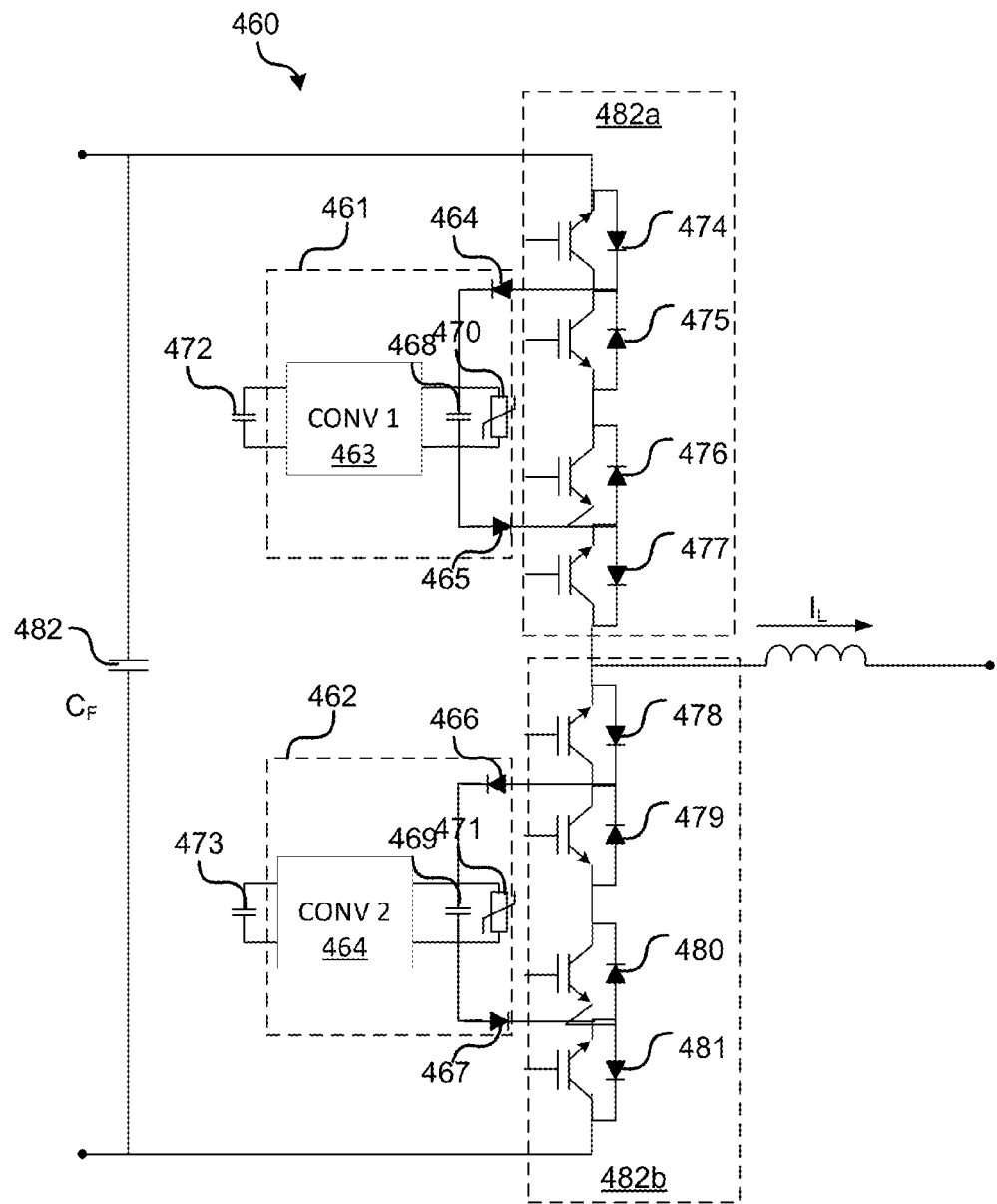
FIG. 4C illustrates an exemplary implementation of DC-DC converter based active AC snubbers applied to a two-level AC chopper implemented with series-connected AC switches.

FIG. 4C illustrates an exemplary implementation 460 of DC-DC converter based active AC snubbers 461-462. The illustrated implementation provides safe commutation and fault tolerance, assuming equal voltage sharing among the series-connected devices 474-481 is ensured through some other means. This equal voltage sharing may be ensured by other known methods such as gate-charge control. In comparison to the implementation 400 illustrated in FIG. 4A, only one snubber 461 or 462 is used for each arm 482a or 482b, respectively. As the voltage is scaled up further and additional devices are introduced in series, one AC snubber may be used for every two AC switches to provide an alternate conduction path for the current.

One of the ordinary skill in the art would appreciate various embodiments may be implemented to any AC-AC converters including direct AC converters, especially where a "freewheeling" path is not inherently present in the topology. The single-phase AC chopper cell as illustrated in 3A-3B and 4A-4C are for illustration purposes only to demonstrate the feature and functionality of various embodiments.

Figure 4D:
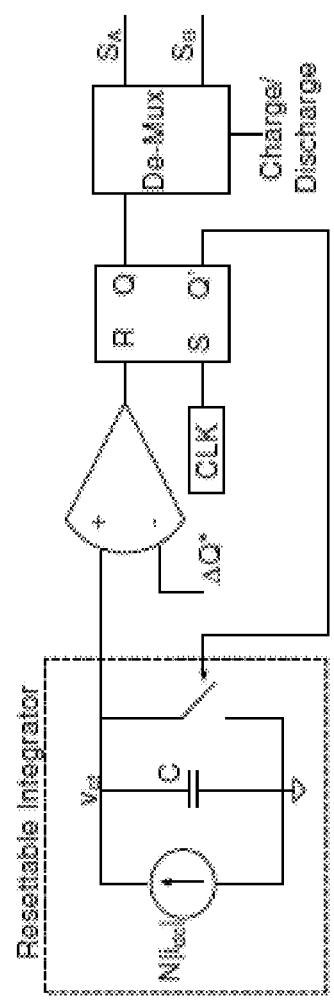
FIGS. 4D illustrates an exemplary control diagram of an active snubber, such as the active snubbers in FIG. 4A.

FIGS. 4D illustrates an exemplary control diagram of an active snubber, such as the active snubbers 401-404 in FIG. 4A. The reference charge is calculated based on the relationship of charge to voltage in a capacitor, $Q=C\Delta V$, and energy stored in a capacitor, $E=1/2 CV^2$. The reference charge required to build or lower the voltage on the snubber capacitor Cs, is provided as Equations (1) for charging Cs and Equation (2) for discharging Cs:

$$\Delta Q^* = \frac{\hat{V}_{ref} + \hat{V}_{Cs}}{2\hat{V}_{DC}} Cs |\Delta \hat{V}^*| \quad (1)$$

$$\Delta Q^* = Cs|\Delta \hat{V}^*| + \Delta Q_L \quad (2)$$

where Cs is the snubber capacitance, $\Delta \hat{V}^*$ is the desired voltage change ($\Delta \hat{V}^* = \hat{V}_{ref} - \hat{V}_{Cs}$), $\hat{V}_{Cs}$ is the voltage across the snubber capacitor, and $\hat{V}_{DC}$ is the DC voltage of the capacitor tank.

Additional charge reference, $\Delta Q_L$, is included to compensate for the losses and loading of the DC capacitor through a non-linear proportional controller with the DC voltage as the feedback term. This controller is described by Equation (3):

$$\Delta Q_L^* = K_P \hat{V}_{DCierr}^2 \quad (3)$$

where $K_P$ is the proportional gain $$\left( \frac{\Delta Q^* = C_{DC}}{2V_{DC}^*} \right),$$

$\hat{V}^*_{DC}$ is the reference DC voltage.

When energy is transferred from the snubber capacitor to the DC tank (discharge), the device, $S_B$ (e.g., switch 452 in FIG. 4B), is kept off, and only the device, $S_A$ (e.g., switch 451 in FIG. 4B), is modulated. When $S_A$ is active, the inductor LDC is charged. The current that flows during this time interval is integrated with respect to time. When the output of this integral equals the delta charge of Equation (1) for charging, the switch $S_A$ is turned off using, and the energy in the DC inductor is pumped into the DC capacitor. The clock frequency is set such that the switch $S_A$ is kept off until the current through the inductor drops to zero. The sequence is repeated in order to synthesize a voltage across the snubber capacitor according to some reference half-wave waveform $\hat{V}_{ref}$.

When energy is transferred from the DC tank to the snubber capacitor (charge), the process described above is reversed. This time, the device $S_A$ is kept off, while the device $S_B$ is modulated based on the charge reference given by Equation (2) for discharging.

Figure 5B:
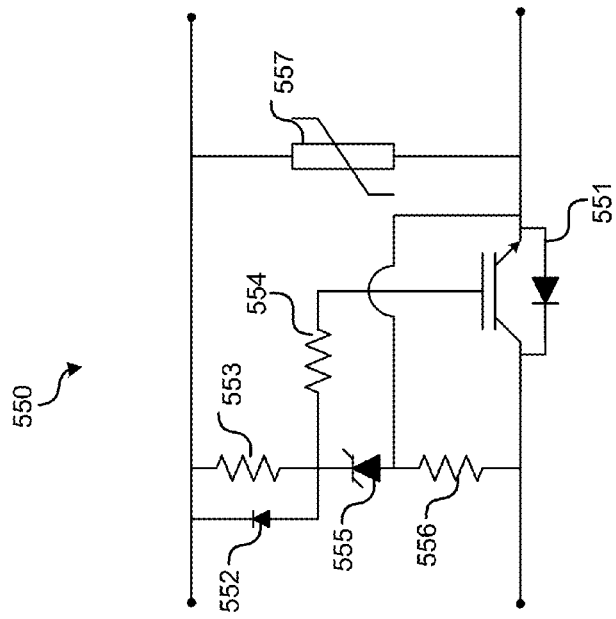
FIG. 5B illustrates a circuit diagram of a rectifier providing the half-wave rectification.
Figure 5A:
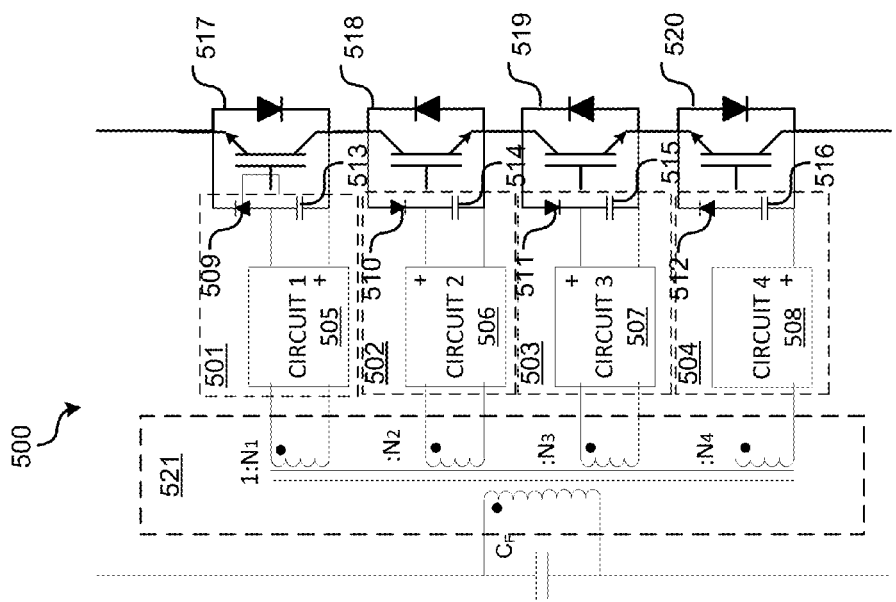
FIG. 5A illustrates an exemplary implementation of an active AC snubber.

FIG. 5A illustrates an exemplary implementation of an active AC snubber 500. The illustrated active AC snubber is based on a low-frequency rectifier that rectifies the input line voltage. The snubbers 501-504 may be based on a rectifier that provides the half-wave rectification, such as the circuit 550 illustrated in FIG. 5B. Each of the snubbers 501-504 comprises a rectifier circuit, a diode, and a snubber capacitor. For example, the snubber 501 comprises the rectifier circuit 505, the diode 509 and the rectifier capacitor 513. The low frequency transformer 521 may provide energy transfer between the line voltage and the snubber capacitors 513-516. In further embodiments, the active snubbers 501-504 may comprise the secondary winding of the transformer 521 or the transformer 521. The transformer turn ratios may be appropriately set in order to control the voltage magnitude across the snubber capacitor 513-516 to be slightly higher than the actual blocking voltage in order to reverse bias the snubber diodes 509-512.

FIG. 5B illustrates a circuit diagram of a rectifier 550 providing the half-wave rectification. The switch 551 (for example, an IGBT or a MOSFET) may be automatically activated when the line voltage is positive, as illustrated in FIG. 5A. The associated circuitry to self-drive the switch 551 comprises diodes 552 and 555, resistors 553, 554, and 556. In some embodiments, as illustrated, a MOV 557 may be placed in parallel to the output of the rectifier 550 to dissipate large amount of energy during fault contingencies when devices are turned off suddenly. The MOV 557 clamps the voltage across the capacitors 513-516 within certain level and dissipates the excess energy, protecting both the main devices 517-520 and the snubber circuitry 501-504.

Figure 6A:
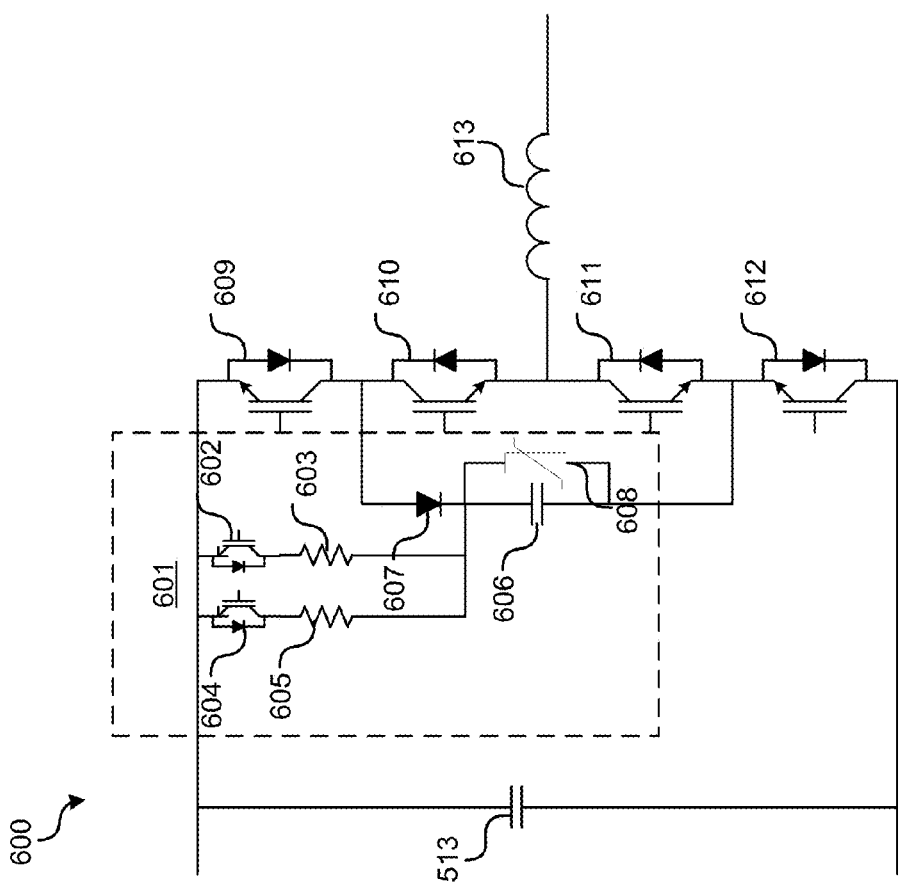
FIG. 6A is an exemplary circuit diagram of a quasi-active AC snubber applied to an AC chopper cell.

FIG. 6A is an exemplary circuit diagram of a quasi-active AC snubber 601 applied to an AC chopper cell. The AC chopper cell comprises switching devices 609-612 and an inductor 613. The AC snubber 601 comprises switches 602 and 604, resistors 603 and 605, a diode 607, a capacitor 606, and a MOV 608. The snubber capacitor 606 may synthesize the AC source 209 as illustrated in FIG. 2A. Switch 602 and resistor 603 may discharge the snubber capacitor 606 during the positive half-wave of the line voltage, and switch 604 and resistor 605 may discharge the snubber capacitor 606 during the negative half-wave of the line voltage. Resistors 603 and 605 may have different values because the voltage across a resistor during positive half-wave is a small fraction of the line voltage, while the voltage during negative half-wave is full peak of the line voltage.

The AC snubber 601 may further comprise a control module which regulates the switching on and off of the switches 604 and 602 such that the snubber capacitor 606 provides a half-wave rectifier voltage. The implementation of the AC snubber may be based on a discrete analog design that operates entirely separate from the main controller of the converter. The control is based on hysteresis control where the voltage across the snubber capacitor 606 is regulated within two bands through control of the switches 602 and 604.

Figure 6B:
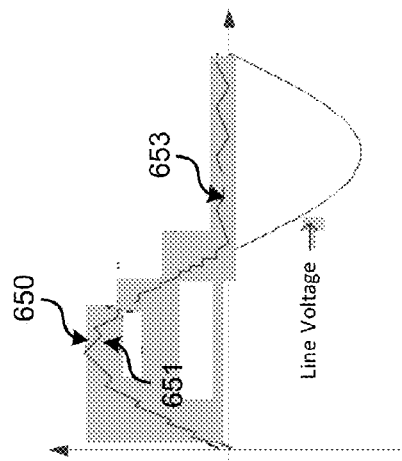
FIG. 6B depicts an exemplary waveform based on hysteresis-based control of the snubber capacitor voltage in accordance with an embodiment.

FIG. 6B depicts an exemplary waveform based on hysteresis-based control of the snubber capacitor voltage in accordance with an embodiment. As illustrated, the waveform 653 is the snubber voltage trajectory. Waveforms 650 and 651 are the upper and lower boundary for defining the snubber voltage, respectively. Here, the lower boundary is selected so that it is slightly higher than the half-wave of the AC input voltage in order to reverse bias the diode 607 during normal operation. The upper boundary is selected in accordance with the RC time constant associated with the discharge resistor and snubber capacitor to provide a certain effective switching frequency while discharging the snubber capacitor. To optimize performance and minimize losses, resistor 605 is selected to be a large resistor. In one embodiment, the size of the snubber capacitor 655 is very small (e.g., in the order of 0.1 to 1 µF), the dissipated energy is typically a very small fraction of the total energy handled by the voltage converter as used in one embodiment of the CD-PAR.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Figure 7:
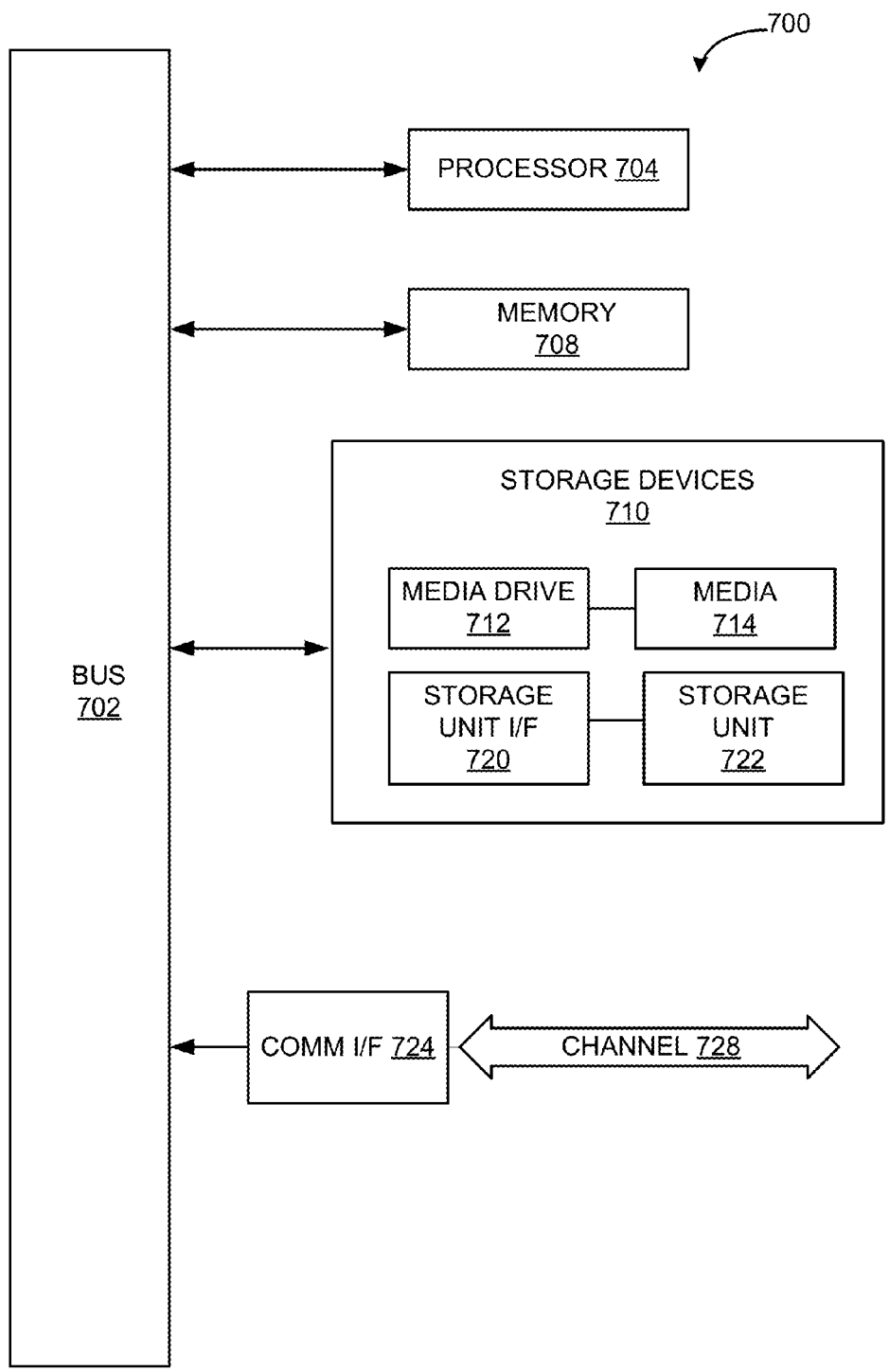
FIG. 7 illustrates an example computing module that may be used in implementing various features of embodiments of the invention.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for preventing voltage transients in an alternating current (AC) AC-AC converter comprising an inductor, comprising:
   a diode; and
   a AC source circuit having an output, the output of the AC source circuit having a first terminal and a second terminal, the first terminal of the AC source circuit coupled to an anode of the diode;
   wherein the diode and the AC source circuit provide a current path for a current flowing through the inductor of the AC-AC converter if an operational current path of the AC-AC converter is interrupted.

2. The system of claim 1, wherein the AC source circuit generates a positive voltage tracking an input voltage to the AC-AC converter during a positive cycle.

3. The system of claim 1, further comprising a second diode, a cathode of the second diode coupled to the second terminal of the AC source, wherein the first and the second diodes and the AC source circuit provide the current path for the current flowing through the inductor of the AC-AC converter.

4. The system of claim 1, wherein the AC source is a capacitor, further comprising:
   a capacitor charging circuit comprising a first switch coupled to a first resistor, wherein the capacitor charging circuit charges the capacitor when the input voltage to the AC-AC converter is positive;
   a capacitor discharging circuit comprising a second switch coupled to a second resistor, wherein the capacitor discharging circuit discharges the capacitor when the input voltage to the AC-AC converter is negative;
   wherein the resistance of the second resistor is larger than the resistance of the first resistor.

5. The system of claim 1, further comprising a control module regulating the AC source circuit to generate a voltage between a first limit and a second limit.

6. The system of claim 5, wherein the AC source circuit comprises:
   a direct-current (DC) energy storage element;
   a DC-DC converter having an input and an output, the input of the DC-DC converter coupled to the DC energy storage element; and
   a capacitor coupled to the output of the DC-DC converter, the output of the DC-DC converter is the output of the AC source circuit.

7. The system of claim 6, wherein the control module regulates a duty cycle of the DC-DC converter.

8. The system of claim 6, wherein DC-DC converter further comprises a metal-oxide varistor (MOV) coupled to the output of the DC-DC converter.

9. The system of claim 6, wherein the DC-DC converter is a buck-boost converter or a fly-back converter.

10. A system for preventing voltage transients in an alternating current (AC) AC-AC converter comprising a set of switches and an inductor, comprising:
    a diode;
    an AC source circuit having an output, the output of the AC source circuit having a first terminal and a second terminal, the first terminal of the AC source circuit coupled to the diode; wherein all switches of the AC-AC are off, and the diode and the AC source circuit provide a current path for a current flowing through the inductor of the AC-AC converter when the operational current path of the AC-AC converter is interrupted.

11. The system of claim 10, wherein the first terminal of the AC source circuit is a positive terminal, the first terminal of the AC source circuit coupled to an anode of the diode, a cathode of the diode coupled to a first terminal of a switch of the set of switches, and the second terminal of the AC source circuit coupled to a second terminal of the switch of the set of switches.

12. The system of claim 10, wherein the second terminal of the AC source circuit is a positive terminal, the first terminal of the AC source circuit coupled to the cathode of the diode, the anode of the diode coupled to a first terminal of a switch of the set of switches, and the second terminal of the AC source circuit coupled to a second terminal of the switch of the set of switches.

13. The system of claim 10, wherein the AC source circuit generates a voltage tracking an input voltage to the AC-AC converter in a positive half cycle or a negative half cycle of the input voltage.

14. The system of claim 13, further comprising a control module regulating the first AC source circuit such that the voltage generated is between a first limit and a second limit.

15. The system of claim 14, wherein the AC source circuit comprises: a
    direct-current (DC) energy storage element;
    a DC-DC converter having an input and an output, the input of the DC-DC converter coupled to the DC energy storage element; and
    a capacitor coupled to the output of the DC-DC converter, the output of the DCDC converter is the output of the AC source circuit.

16. The system of claim 15, wherein the control module regulates a duty cycle of the DC-DC converter.

17. The system of claim 15 wherein DC-DC converter further comprises a metal-oxide varistor (MOV) coupled to the output of the DC-DC converter.

18. The system of claim 15, wherein the DC-DC converter is a buck-boost converter or a fly-back converter.

19. The system of claim 13, wherein the AC source circuit comprises:
    a transformer, a first winding of the transformer coupled to an input of the AC-AC converter;

an AC-DC rectifier having an input and an output, the input of the AC-DC rectifier coupled to a second winding of the transformer; and a capacitor coupled to the output of the AC-DC converter, the output of the AC-DC rectifier is the output of the AC source circuit.

20. The system of claim 19, wherein the AC-DC rectifier comprises a switch and an associated circuit, the associated circuit turns on the switch when the input voltage to the AC-AC converter is positive.

21. The system of claim 19, wherein the AC-DC rectifier comprises a switch and an associated circuit, the associated circuit turns on the switch when the input voltage to the AC-AC converter is negative.

22. The system of claim 19, wherein AC-DC rectifier further comprises a metal-oxide varistor (MOV) coupled to the output of the DC-DC converter.

* * * * *